United States Patent
James et al.

(10) Patent No.: US 10,402,643 B2
(45) Date of Patent: Sep. 3, 2019

(54) OBJECT REJECTION SYSTEM AND METHOD

(71) Applicant: Google Inc., Mountain View, CA (US)

(72) Inventors: Bryan James, Menlo Park, CA (US); Yash Modi, San Mateo, CA (US); Aveek Ravishekhar Purohit, Mountain View, CA (US); Kenneth Louis Herman, San Jose, CA (US); Mark Rajan Malhotra, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 126 days.

(21) Appl. No.: 15/183,471

(22) Filed: Jun. 15, 2016

(65) Prior Publication Data

US 2017/0364743 A1    Dec. 21, 2017

(51) Int. Cl.
*G06K 9/00* (2006.01)
*G06K 9/20* (2006.01)

(52) U.S. Cl.
CPC ..... *G06K 9/00543* (2013.01); *G06K 9/00771* (2013.01); *G06K 9/2018* (2013.01)

(58) Field of Classification Search
CPC .......... G06K 9/00362; G06K 9/00523; G06K 9/00543
See application file for complete search history.

(56) References Cited

U.S. PATENT DOCUMENTS

| | | | | |
|---|---|---|---|---|
| 6,265,972 B1 * | 7/2001 | Lee | ...... | G08B 13/193 250/342 |
| 7,132,941 B2 * | 11/2006 | Sherlock | ...... | G08B 21/22 340/539.26 |
| 7,809,192 B2 * | 10/2010 | Gokturk | ...... | G06F 17/30253 382/176 |
| 8,306,265 B2 * | 11/2012 | Fry | ...... | A61B 5/0452 348/143 |
| 8,379,940 B2 * | 2/2013 | Wechsler | ...... | G06K 9/6228 382/118 |
| 8,542,118 B2 * | 9/2013 | Al-Kadi | ...... | G01V 8/20 340/541 |
| 8,542,879 B1 * | 9/2013 | Nechyba | ...... | G06K 9/00228 382/103 |
| 8,649,572 B2 * | 2/2014 | Gokturk | ...... | G06F 17/30253 382/118 |
| 9,008,435 B2 * | 4/2015 | Gokturk | ...... | G06F 17/30259 382/190 |
| 9,202,105 B1 * | 12/2015 | Wang | ...... | G06Q 20/4014 |
| 9,342,735 B2 * | 5/2016 | Polimeno | ...... | G06K 9/00221 |
| 9,367,733 B2 * | 6/2016 | Zhu | ...... | G06K 9/00369 |

(Continued)

*Primary Examiner* — Brian P Yenke
(74) *Attorney, Agent, or Firm* — Morris & Kamlay LLP (57) ABSTRACT

A system and method for detecting human intruders while rejecting/ignoring an occupant's registered pet. An object detection system is configured to detect an object that is present in a monitored area and generate a signal output relative to the type of object. A signature processor is configured to receive the generated signal output and produce an object signature, and compare a threshold signature to the object signature, wherein the threshold signature is generated using a photograph of a reserved object, and wherein the object detection system rejects the detected object when the object signature is determined to be similar to the threshold signatures.

20 Claims, 9 Drawing Sheets

(56) References Cited

U.S. PATENT DOCUMENTS

| | | | | |
|---|---|---|---|---|
| 9,443,166 B2* | 9/2016 | Kinard | | G06K 9/6201 |
| 9,466,189 B2* | 10/2016 | Patterson | | G08B 13/00 |
| 9,472,072 B2* | 10/2016 | M | | G08B 13/19669 |
| 9,558,639 B2* | 1/2017 | Modi | | G08B 13/08 |
| 9,627,705 B2* | 4/2017 | Martinchek | | H01M 8/2475 |
| 9,648,285 B2* | 5/2017 | Traff | | H04N 5/33 |
| 9,648,819 B1* | 5/2017 | Hancock | | A01H 5/10 |
| 9,733,127 B2* | 8/2017 | Purohit | | G08B 13/2494 |
| 9,742,754 B2* | 8/2017 | Kormann | | G01S 19/14 |
| 10,136,184 B2* | 11/2018 | Hicks | | H05K 999/99 |
| 2003/0169906 A1* | 9/2003 | Gokturk | | G06K 9/00201 |
| | | | | 382/115 |
| 2004/0117638 A1* | 6/2004 | Monroe | | G06K 9/00221 |
| | | | | 713/186 |
| 2006/0115116 A1* | 6/2006 | Iwasaki | | G06K 9/00348 |
| | | | | 382/103 |
| 2008/0042824 A1* | 2/2008 | Kates | | G08B 13/183 |
| | | | | 340/522 |
| 2008/0285802 A1* | 11/2008 | Bramblet | | G07C 9/00 |
| | | | | 382/103 |
| 2009/0022362 A1* | 1/2009 | Gagvani | | G06T 7/254 |
| | | | | 382/100 |
| 2009/0215533 A1* | 8/2009 | Zalewski | | A63F 13/00 |
| | | | | 463/32 |
| 2009/0244291 A1* | 10/2009 | Saptharishi | | G06K 9/00771 |
| | | | | 348/187 |
| 2009/0245603 A1* | 10/2009 | Koruga | | A45D 44/00 |
| | | | | 382/128 |
| 2010/0329544 A1* | 12/2010 | Sabe | | G06K 9/00288 |
| | | | | 382/159 |
| 2012/0081282 A1* | 4/2012 | Chin | | G06F 3/011 |
| | | | | 345/156 |
| 2012/0087572 A1* | 4/2012 | Dedeoglu | | G06K 9/00771 |
| | | | | 382/154 |
| 2013/0278422 A1* | 10/2013 | Friedman | | G08B 13/196 |
| | | | | 340/541 |
| 2013/0329949 A1* | 12/2013 | Murata | | G06T 7/0044 |
| | | | | 382/103 |
| 2014/0077932 A1* | 3/2014 | Rooyakkers | | G08B 5/222 |
| | | | | 340/7.51 |
| 2014/0139633 A1* | 5/2014 | Wang | | G06K 9/00201 |
| | | | | 348/46 |
| 2015/0116107 A1* | 4/2015 | Fadell | | G08B 19/005 |
| | | | | 340/501 |
| 2015/0131868 A1* | 5/2015 | Rooyakkers | | G06K 9/00248 |
| | | | | 382/110 |
| 2015/0358557 A1* | 12/2015 | Terre | | H04N 5/2257 |
| | | | | 348/164 |
| 2016/0335865 A1* | 11/2016 | Sayavong | | G08B 13/2491 |
| 2016/0342693 A1* | 11/2016 | Samuel | | G06Q 50/01 |
| 2016/0379174 A1* | 12/2016 | Yust | | G06Q 10/1095 |
| | | | | 705/7.19 |
| 2017/0018158 A1* | 1/2017 | Sayavong | | G08B 13/2491 |
| 2017/0018159 A1* | 1/2017 | Sayavong | | G08B 13/2491 |
| 2017/0018170 A1* | 1/2017 | Sayavong | | G08B 13/2491 |
| 2017/0132888 A1* | 5/2017 | Conlon | | G08B 13/1672 |
| 2017/0205288 A1* | 7/2017 | Purohit | | G08B 13/2494 |

* cited by examiner

OBJECT REJECTION SYSTEM AND METHOD

BACKGROUND

Security systems utilize infrared (IR) motion sensing devices to detect the presence of an unauthorized person within a monitored area. These sensing devices, though, are not able to discern between the presence of a human and the presence of an animal, such as an occupant's pet. As such, security alarm systems are falsely triggered when the sensing device detects an animal.

BRIEF SUMMARY

The present subject matter is a system and method for detecting human intruders while rejecting/ignoring an occupant's registered pet. According to an embodiment of the disclosed subject matter, a system includes an object detection system configured to detect an object that has entered a monitored area and generate a signal output relative to the type of object, and a signature processor configured to receive the generated signal output and produce an object signature; and compare a threshold signature to the object signature, wherein the threshold signature is generated using a photograph of a reserved object, and wherein the object detection system rejects the detected object when the object signature is determined to be similar to the threshold signatures.

In an aspect of the embodiment, the signature processor compares a peak amplitude of the threshold signature to a peak amplitude of the object signature to determine whether the object is the reserved object or an unauthorized object.

In an aspect of the embodiment, the object detection system comprises a sensor configured to detect the presence of the object in the monitored area and produce a change signal, and a sensor processor configured to generate the signal output based on the change signal.

In an aspect of the embodiment, the sensor is a motion sensor.

In an aspect of the embodiment, the sensor is a passive infrared (PIR) sensor.

In an aspect of the embodiment, the photograph is a picture of an occupant's pet.

In an aspect of the embodiment, the estimated characteristics of the object from the photograph are used to generate the threshold signature.

In an aspect of the embodiment, further comprising a service provider server configured to estimate characteristics of the reserved object in the photograph, generate the threshold signature using the estimated characteristics, and forward to the object detection system the threshold signature.

In an aspect of the embodiment, the service provider server is further configured to retrieve from a pattern database a pattern signature that is associated with an object having similar characteristics as the estimated characteristics, wherein the retrieved pattern signature is the threshold signature.

In an aspect of the embodiment, the estimated characteristics include one or more of height, weight, length, type of object, and hair length.

In an aspect of the embodiment, the pattern database includes a plurality of pattern signatures, each pattern signature associated with an object having certain characteristics, wherein the certain characteristics are compared to the estimated characteristics.

In an aspect of the embodiment, the reserved object in the photograph is an occupant's pet.

According to an embodiment of the disclosed subject matter, a method detecting an object that has entered a monitored area, generating a signal output relative to the type of object, generating an object signature based on the signal output, and comparing a threshold signature to the object signature, wherein the threshold signature is generated using a photograph of a reserved object, and wherein the object detection system rejects the detected object when the object signature is determined to be less than or equal to the threshold signatures.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

A disclosed implementation of the present subject matter is directed to providing a detection system that rejects/ignores the detection of a reserved object, e.g., an occupant's pet, within a monitored area. The detection system utilizes a photograph of the occupant's pet to determine the pet's signature. The determined pet signature may then be used as a threshold signature for the detection system. Upon detection of an object in a monitored area, the detection system determines whether the detected object is the occupant's pet or an unauthorized human, by comparing the detected object's signature with the threshold signature. If the object signature is greater than the threshold signature, the detection system indicates that an unauthorized object has been detected in the monitored area. If the object signature is less than or equal to the threshold signature, the detection system determines that the detected object is the occupant's pet and ignores the detected object.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 1:
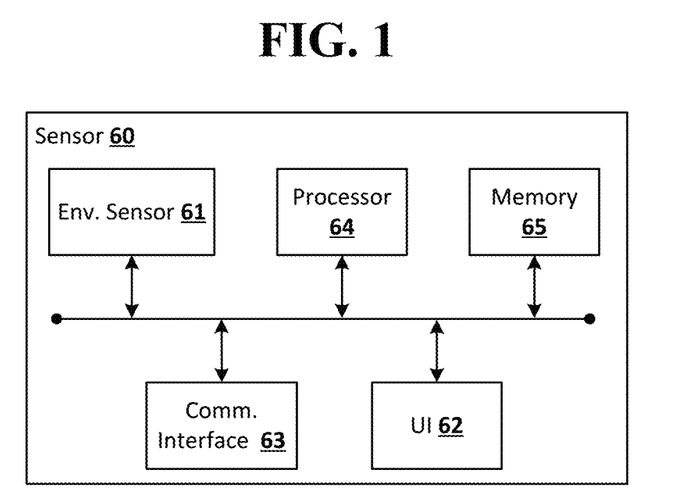
FIG. 1 shows an example sensor according to an embodiment of the disclosed subject matter.

A sensor may include hardware in addition to the specific physical sensor that obtains information about the environment. FIG. 1 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor may determine that it is dark (e.g., less than 60 lux) in the room of a home in which it is located. A microphone may detect a sound above a set threshold, such as 60 dB, in the home. The processor may determine, based on the data generated by both sensors that it should activate all of the lights in the room. In the event the processor only received data from the ambient light sensor, it may not have any basis to alter the state of the lighting in the room. Similarly, if the processor only received data from the microphone, it may not make sense to activate the lights in the room because it is daytime or bright in the room (e.g., the lights are already on). As another example, two or more sensors may communicate with one another. Thus, data generated by multiple sensors simultaneously or nearly simultaneously may be used to determine a state of an environment and, based on the determined state, generate a response.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 2:
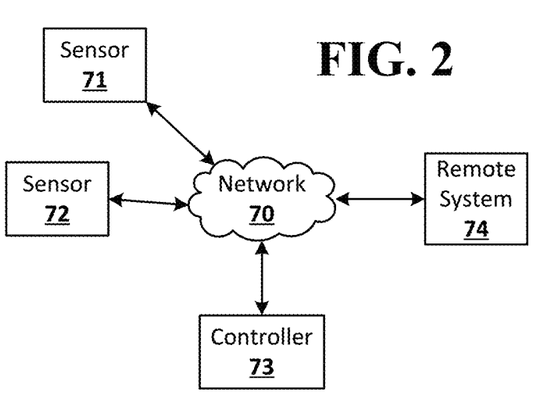
FIG. 2 shows an example of a sensor network according to an embodiment of the disclosed subject matter.

FIG. 2 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 2 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 2 may include a plurality of devices, including intelligent, multi-sensing, network-connected devices, that can integrate seamlessly with each other and/or with a central server or a cloud-computing system (e.g., controller 73 and/or remote system 74) to provide home-security, as disclosed herein, and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 2.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

In some configurations, a remote system 74, for example a service provider, may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 2 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

Figure 3:
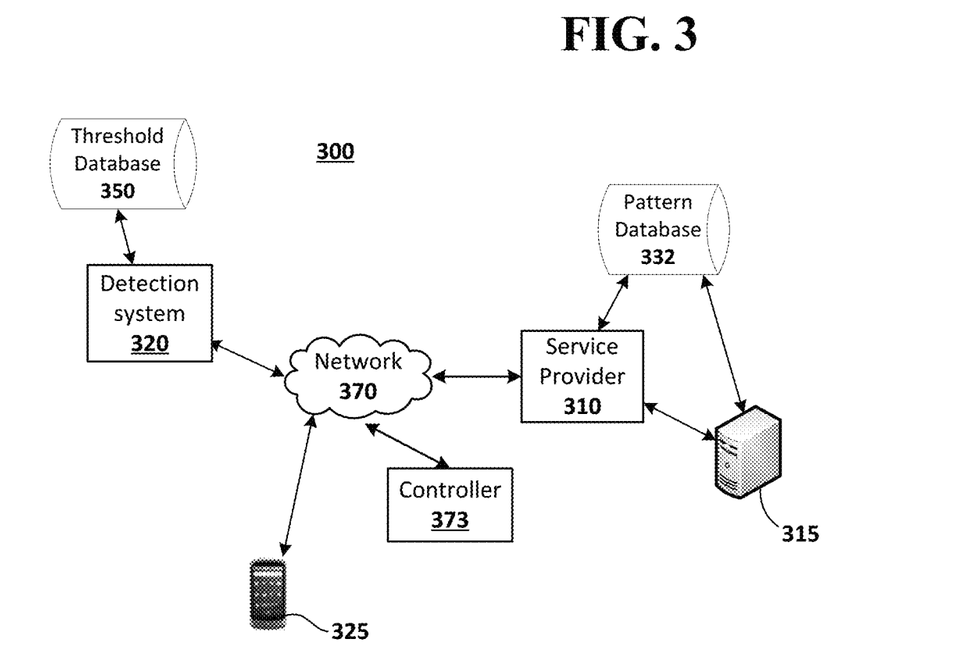
FIG. 3 shows an example block diagram of a premises monitoring system according to an embodiment of the disclosed subject matter.

FIG. 3 shows an example block diagram of an implementation of premises monitoring system that may be included in a sensor network. The premises monitoring system 300 includes an object detection system 320 that is configured to ignore/reject reserved objects detected in an occupant's premises, i.e., a monitored area, and a service provider 310. An occupant of a monitored site 320 may utilize a premises monitoring service offered by the service provider 310 to monitor the occupant's home, office, etc. As a part of this service, the service provider 310 may provide the occupant with the option of adjusting the detection system installed at the monitoring site 320 to reserve objects to be ignored by the detection system. For example, the occupant may have the option of requesting that the detection system ignore the family pet, such as a dog, entering an actively monitored area that, if detected, may falsely trigger a security alarm, i.e., a pet rejection service.

Figure 6A:
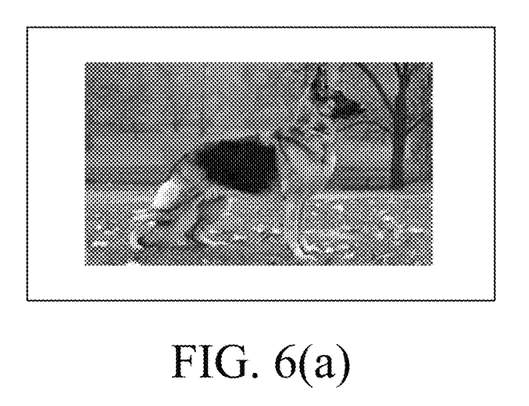
FIG. 6(a), 6(b), 6(c) show example object photographs according to an embodiment of the disclosed subject matter.
Figure 6B:
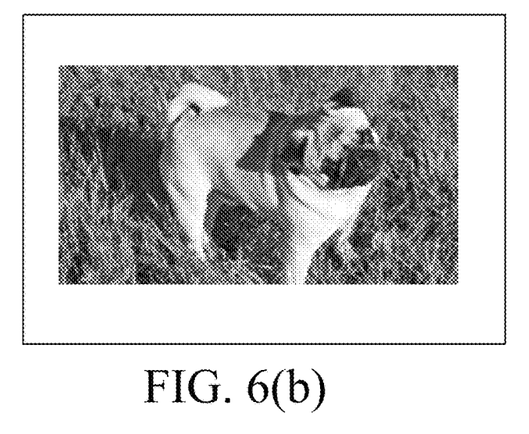
Figure 6C:
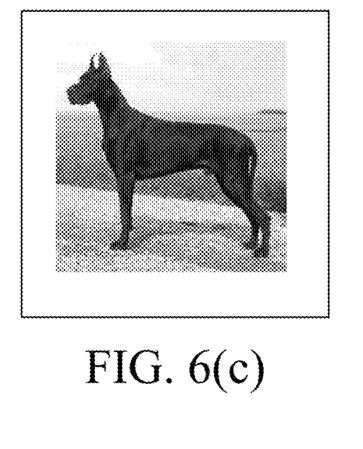

Embodiments allow the occupant to upload a photograph of the object that is to be registered and reserved. FIGS. 6(a), 6(b) and 6(c) show example object photographs that may be uploaded by the occupant. Although the photographs shown are of dogs, it should be noted that any object that the occupant wishes to reserve may be selected and a photograph uploaded, including but not limited to any animal that walks, crawls and/or flies that may be detected by a motion sensing device.

Referring back to FIG. 3, the photograph may be uploaded by the occupant to the service provider 310 via any computing device 325 where the photograph may be accessible for uploading. The computing device 325 uploads the photograph via network 370 to the service provider 310 in an embodiment.

The uploaded photograph may then be downloaded to the service provider server 315. The server 315 includes a processor that is configured to generate a reserved object signature using the uploaded photograph. This may include an identity or description of the object shown in the photograph if that information is not provided by the occupant. In order to generate the reserved object signature, the server 315 determines characteristics of the object that is displayed in the photograph. In some embodiments, this determination may be made using input from the occupant when the photograph is uploaded. For example, the occupant may have indicated that the photograph is a picture of the occupant's family dog. Based on the received information and the photograph, the servicer 315 may estimate at least the height, length, weight and other visual characteristics of the object that is pictured. Alternatively, one or more of these characteristics may be input and/or confirmed by the occupant. Other characteristics, which may also be determined based on the breed of the animal, may include hair length, i.e., long or short and activity pattern, i.e., is the dog very active, for example. Methods and software to estimate certain characteristics of an object in photographs are known and may be executed by the server 315 to estimate the characteristics in some embodiments.

It should be noted that the occupant may include the breed of animal that is being registered using the uploaded photograph.

Once the characteristics of the object have been determined from the photograph, the server 315 may estimate a reserved object signature. The reserved object signature is the signal that may be assigned to the reserved object for comparison to a detected object signature, where the detected object has been observed by an object detection system at a monitored area, as will be disclosed below. The reserved object signature may be generated using the estimated and/or input characteristics. In some embodiments, based on the estimated characteristics, the server 315 may retrieve from a pattern database 332 a stored pattern signature that is associated with an object having characteristics similar to the estimated characteristics of the reserved object. For example, a pattern signature may be stored in the pattern database 332 that is associated with a dog that is the same breed and has a similar height, length, weight, and/or hair length. As such, a stored pattern signature associated with a similar dog having similar characteristics is selected for the occupant's pet.

Figure 8:
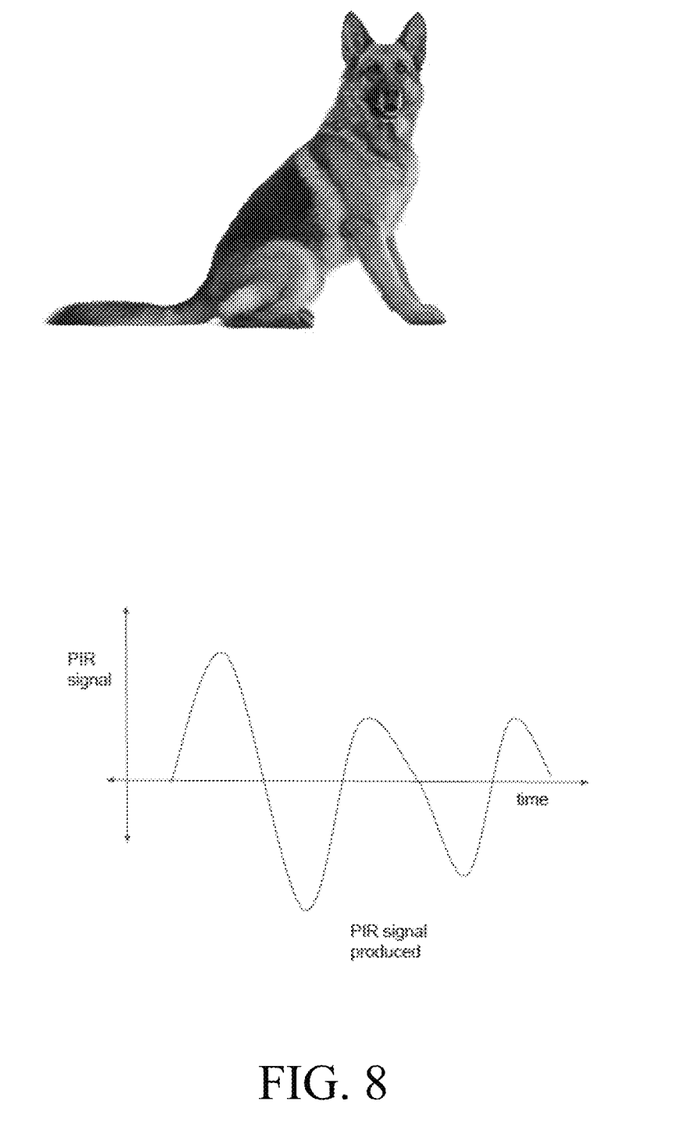
FIG. 8 shows an example photo of a German Shepherd and a pet signature that may be assigned according to an embodiment of the disclosed subject matter.

The pattern database 332 comprises a plurality of stored pattern signatures. The stored pattern signatures may be object signatures that may have been previously generated by an object detection system when detecting the object, and stored in the pattern database 332. FIG. 8 shows an example of a pattern signature that is associated with a German Shepherd and stored in the pattern database.

Pattern signatures may also, in some embodiments, have been generated from testing, such that pattern signatures were tested for objects, e.g., differing breeds of dogs, having certain characteristics. The pattern signatures generated during the testing may then be stored in the pattern database 332.

Once a stored pattern signature has been identified as the reserved object signature, the reserved object signature is downloaded to, and stored in, a threshold database 350 as a threshold/pet signature. The threshold database 350 includes one or more threshold signatures that may be used by an object detection system at the occupant's monitored premises to determine whether an object detected at the monitored premises is an animal/pet or a human, and whether to trigger an alarm based on the determination, to be disclosed below.

Figure 4:
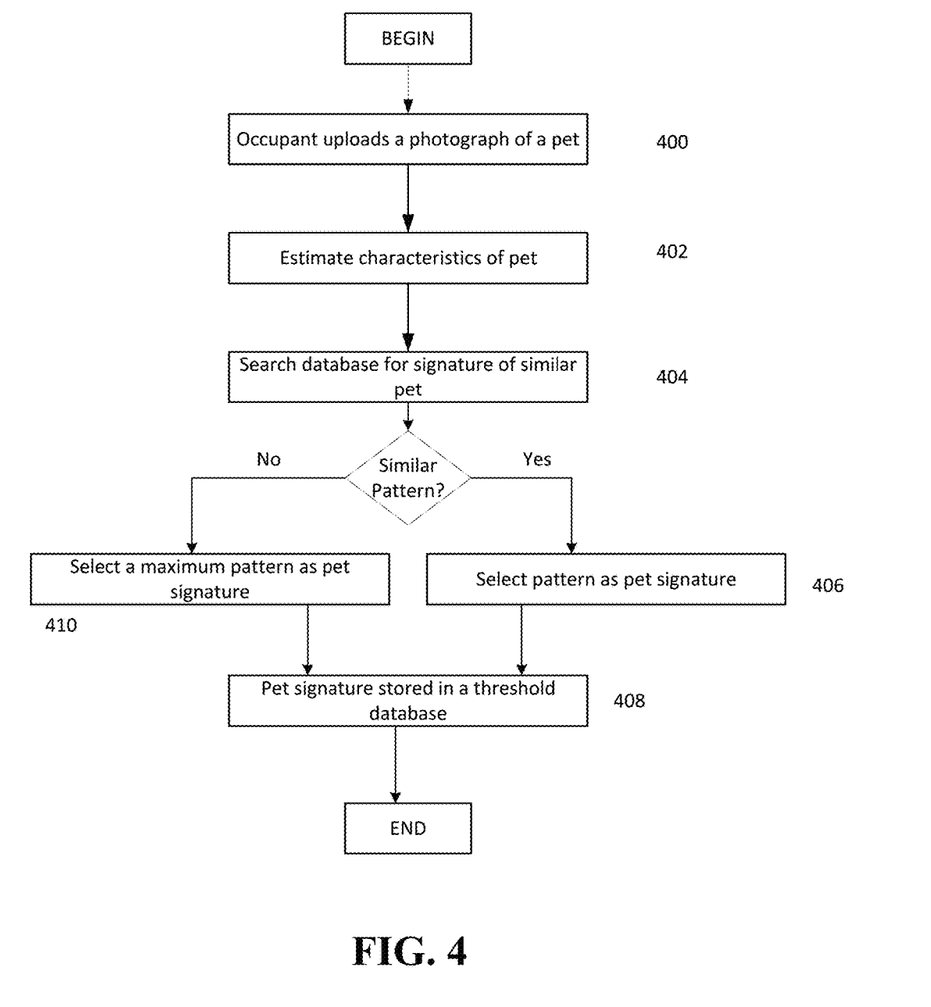
FIG. 4 shows an example flow diagram of the method for generating the threshold/pet signature for an occupant according to an embodiment of the disclosed subject matter.

FIG. 4 shows a flow diagram of the method for generating the threshold/pet signature for an occupant. An occupant uploads one or more photographs of the occupant's pet to the service provider (400). Pet characteristics are estimated for the pet based on at least the uploaded photograph (402). The service provider searches a pattern database to determine if a pattern signature is stored therein, from an object/pet that is similar to the occupant's pet (404). If a similar pattern signature is stored in the pattern database, the similar pattern signature is selected as a reserved object signature for the occupant's pet (406). The reserved object signature is then stored in a threshold database (408).

If a similar pattern signature is not stored in the pattern database, the service provider may select a pattern signature of an object that may generate a similar object signature or an object signature that would ensure that the reserved object is rejected/ignored by the object detection system (410).

In some embodiments, a reserved object signature may change as the object grows and/or slows down. For example, a pet signature assigned to a dog that is a puppy may be adjusted over time to compensate for the expected growth of the dog. Since the breed of the dog is determined by the server, estimated growth characteristics may be used to automatically adjust the assigned pet signature thoughout the life of the dog. Alternatively, an occupant may upload new pictures of the pet periodically.

In some embodiments, the server may determine that the registered object is too large, based on the estimated characteristics. As a result, the generated threshold would potentially result in the object detection system rejecting/ignoring an unauthorized person. For example, if the occupant uploads a photograph of an adult Great Dane, the server may estimate, based on the determined size, weight and length of the Great Dane, that the pet signature would make the threshold signature too high and prevent the object detection system from detecting an actual intruder, such as a human crawling on the floor. The service provider may then inform the occupant that the registered pet is not eligible for the pet rejection service due to the size of the pet.

Figure 5:
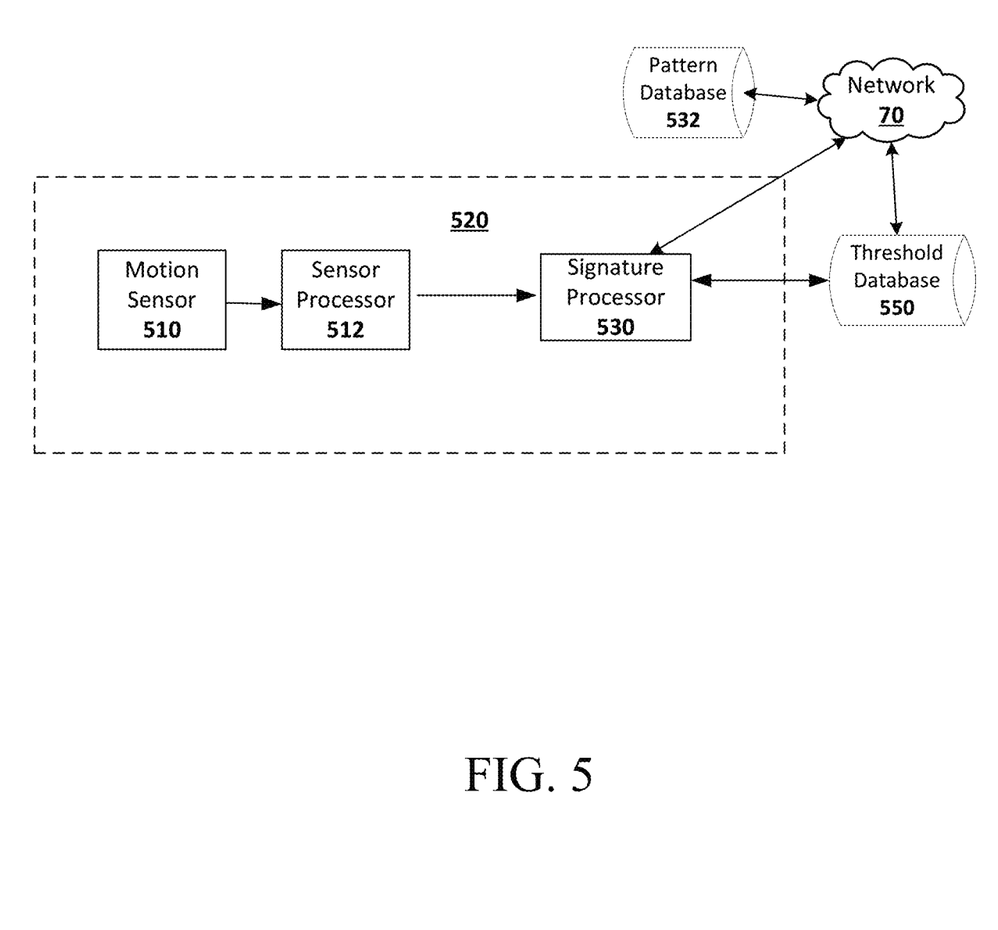
FIG. 5 shows an example of an object detection system according to an embodiment of the disclosed subject matter.

FIG. 5 is an example illustration of an implementation of an object detection system 520 according to the present subject matter. The object detection system 520 includes a motion sensor 510, a sensor processor 512, and a signature processor 530. An example motion sensor may be a passive infrared (PIR) sensor that detects the presence of a change in infrared radiation present in a monitored area. A lens system (not shown) may also be included to focus the infrared radiation from the area being monitored onto the PIR sensor 510. When a target, i.e., object, moves within the monitored area the signal generated by the sensor 510 may correspond to the intensity of the IR radiation captured by each individual lens and focused onto the sensor 510.

The sensor 510 generates a signal that may be filtered, amplified, and/or digitized by the sensor processor 512. As such, upon detection of an object in the field of view of the sensor 510, an output signal may be received by the sensor processor 512 from the sensor 510. The sensor processor 512 digitizes the received signal and forwards the resulting digital signal to the signature processor 530.

Figure 7:
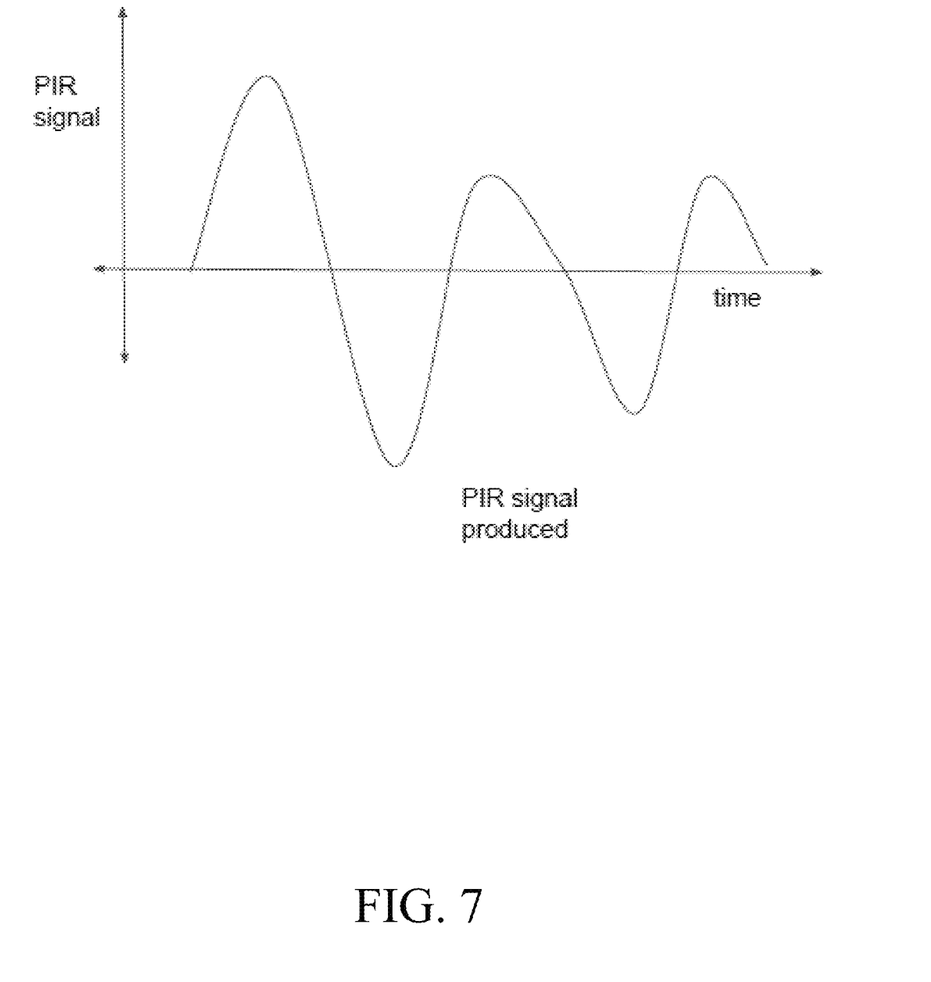
FIG. 7 shows an example object signature according to an embodiment of the disclosed subject matter.

The signature processor 530 is configured to receive the signal from the sensor processor 512, monitor the digital signal received over a predetermined amount of time, for example 5 seconds, and generate an object signature based on the received digital signal. FIG. 7 shows an example object signature generated by the signature processor 530. As illustrated, the object signature may be a signal having a one or more peaks that may represent the IR heat detected by the sensor 510 for the detected object over the predetermined amount of time. In an implementation, a change in the signal received from the PIR sensor 510 may indicate that an object that was not previously present in the monitored area has now entered the monitored area. The received signal may also be stored at a remote system, i.e., a service provider.

Once the object signature has been generated by the signature processor 530, the signature processor 530 determines the appropriate action to take based on the object signature. The signature processor 530 retrieves a threshold signature from the threshold database 550 and compares the determined object signature to the retrieved threshold signature. If the object signature is not similar to the threshold signature, the signature processor 530 may determine that the detected object is not a reserved object, i.e., an unauthorized human, and responds accordingly, for example, initiates a security alarm.

If the object signature is similar to the threshold signature, the signature processor 530 determines that the detected object may be the reserved object and rejects/ignores the object in the monitored area. For example, the signature processor 530 determines whether the object detected in the monitored area is that of the occupant's pet by comparing the generated object signature to the pet signature.

In some embodiments, the peak amplitude of the generated object signature may be compared to the peak amplitude of the threshold signature. If the amplitude of the generated object signature is less than, or equal to, the amplitude of the threshold signature, the object detection system responds accordingly.

Figure 9:
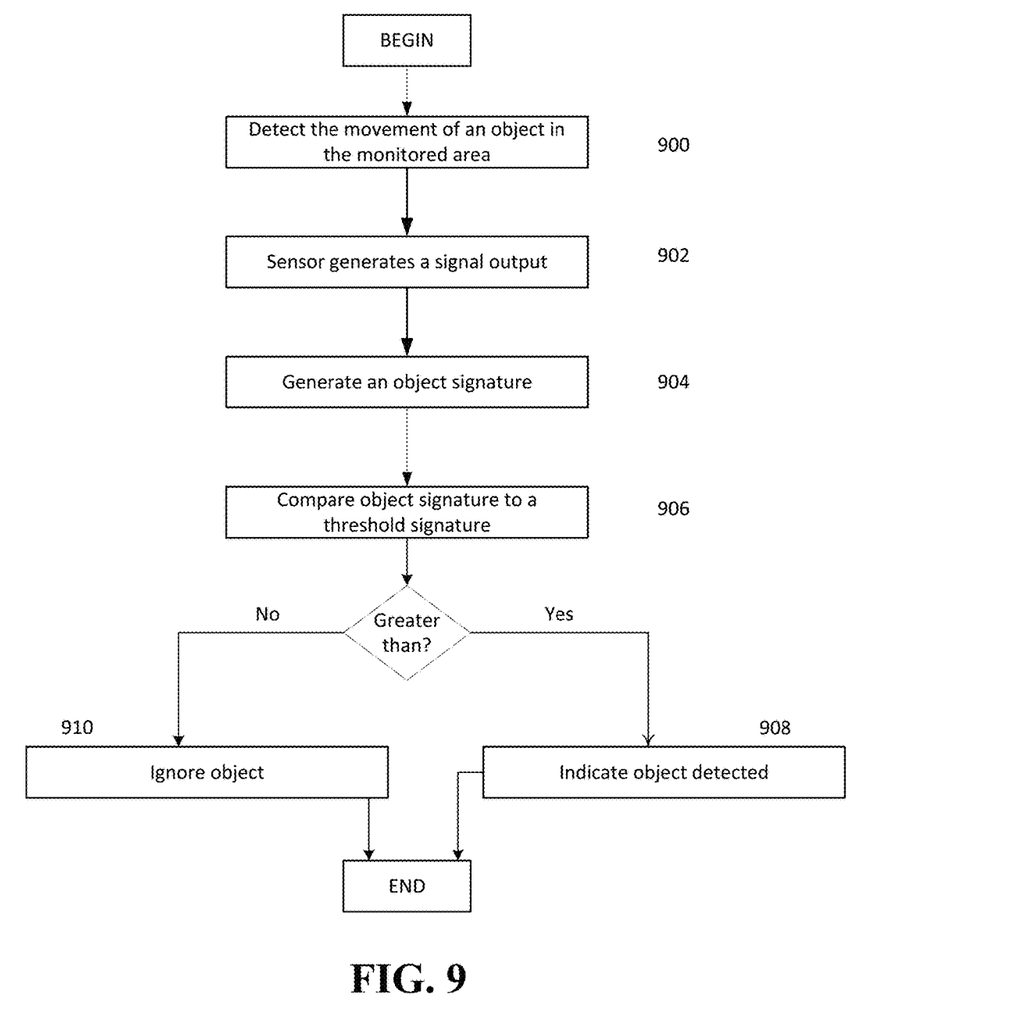
FIG. 9 shows an example flow diagram of a method for detecting objects in a monitored area in accordance with an implementation of the present subject matter.

FIG. 9 shows an example flow diagram of a method for detecting objects in a monitored area in accordance with an implementation of the present subject matter. An object enters the field of view of a motion detection sensor in a monitored area (900). The motion detection sensor generates a signal output that relates to the detected object (902). An object signature is then generated based on the signal output by the sensor (904).

The object signature is compared to a threshold signature to determine if the detected object is to be ignored (906). If the amplitude of the object signature is greater than the amplitude of the threshold signature, the object detection system indicates that an unauthorized object has been detected in the monitored area and initiates an appropriate response (908). Otherwise the object detection system will ignore the detected object (910).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 10:
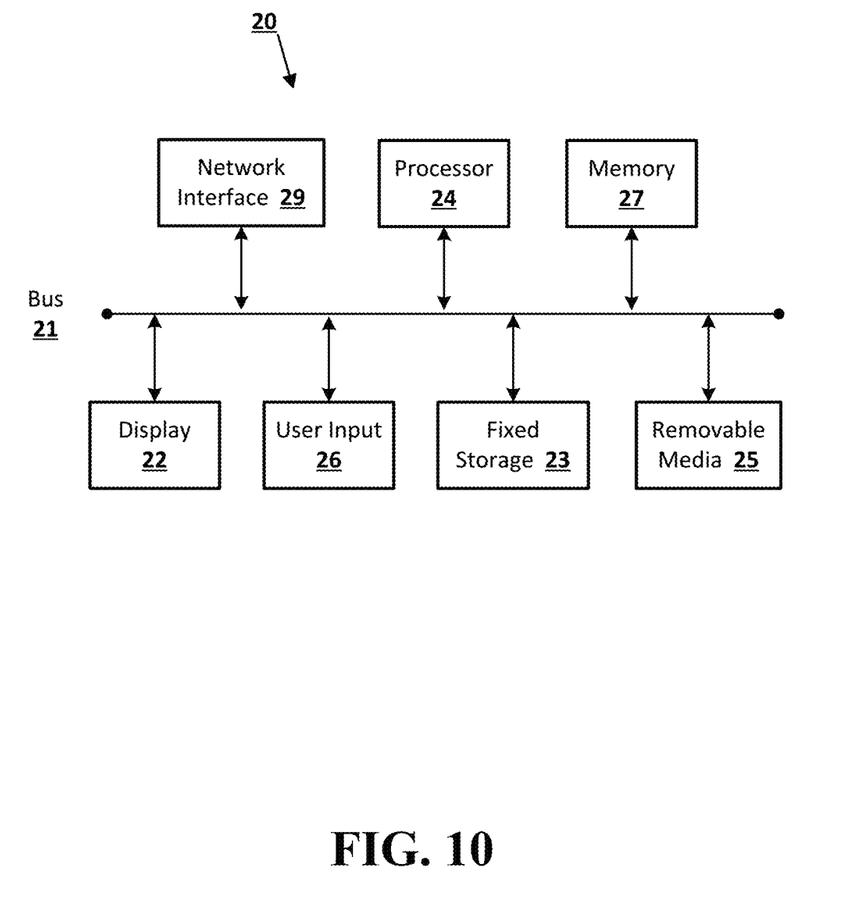
FIG. 10 shows a computing device according to an embodiment of the disclosed subject matter.

Embodiments of the presently disclosed subject matter may be implemented in and used with a variety of computing devices. FIG. 10 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
an object detection system comprising an infrared sensor configured to detect an object that is present in a monitored area and generate a signal output representative of the type of object, wherein the signal output is based on infrared radiation detected from the object; and
a signature processor configured to:
receive the generated signal output and produce an object signature based on the infrared radiation detected from the object; and
compare a threshold signature to the object signature to determine if the object is a reserved object or an unauthorized object,
wherein the threshold signature is generated using a non-infrared photograph of the reserved object and is generated using previously detected infrared radiation from one or more objects identified as having similar non-infrared radiation characteristics to the reserved object based on the non-infrared photograph of the reserved object, wherein the one or more objects do not include the reserved object, and wherein the object detection system rejects the detected object when the object signature is determined to be similar to the threshold signature.

2. The system of claim 1, wherein the signature processor compares a peak amplitude of the threshold signature to a peak amplitude of the object signature to determine whether the object is the reserved object or an unauthorized object.

3. The system of claim 2, wherein the non-infrared photograph is a picture of an occupant's pet.

4. The system of claim 3, wherein estimated characteristics of a part from the non-infrared photograph are used to generate the threshold signature.

5. The system of claim 2, further comprising a service provider server configured to:
estimate characteristics of the reserved object in the non-infrared photograph;
generate the threshold signature using the estimated characteristics; and
forward to the object detection system the threshold signature.

6. The system of claim 5, wherein the service provider server is further configured to retrieve from a pattern database a pattern signature that is associated with an object having similar characteristics as the estimated characteristics, wherein the retrieved pattern signature is the threshold signature.

7. The system of claim 6, wherein the estimated characteristics include one or more of height, weight, length, type of object, and hair length.

8. The system of claim 6,
wherein the pattern database includes a plurality of pattern signatures, each pattern signature associated with an object having object characteristics, and
wherein the threshold signature is generated based on a selection of the pattern signature having objects characteristics similar to the estimated characteristics.

9. The system of claim 5, wherein the reserved object in the non-infrared photograph is an occupant's pet.

10. The system of claim 2, wherein the object detection system comprises:
the infrared sensor configured to detect the presence of the object in the monitored area and produce a sensor signal; and
a sensor processor configured to generate the signal output based on the sensor signal.

11. The system of claim 10, wherein the sensor is a motion sensor.

12. A method comprising:
detecting, by an infrared (PIR) sensor, an object that is present in a monitored area;
generating a signal output representative of the type of object, wherein the signal output is based on infrared radiation detected from the object;
generating an object signature based on the infrared radiation detected from the object using the signal output; and
comparing a threshold signature to the object signature to determine if the object is a reserved object or an unauthorized object,
wherein the threshold signature is generated using a non-infrared photograph of a reserved object and is generated using previously detected infrared radiation from one or more objects identified as having similar non-infrared radiation characteristics to the reserved object based on the non-infrared photograph of the reserved object, wherein the one or more objects do not include the reserved object and wherein the object detection system rejects the detected object when the object signature is determined to be similar to the threshold signature.

13. The method of claim 12, further comprising comparing a peak amplitude of the threshold signature to a peak amplitude of the object signature to determine whether the object is the reserved object or an unauthorized object.

14. The method of claim 13, wherein the non-infrared photograph is a picture of an occupant's pet.

15. The method of claim 14, wherein estimated characteristics of the part from the non-infrared photograph are used to generate the threshold signature.

16. The method of claim 13, further comprising:
estimating characteristics of the reserved object in the non-infrared photograph;
generating the threshold signature using the estimated characteristics; and
forwarding to an object detection system the threshold signature.

17. The method of claim 16, further comprising retrieving from a pattern database a pattern signature that is associated with an object having similar characteristics as the estimated characteristics, wherein the retrieved pattern signature is the threshold signature.

18. The method of claim 17, wherein the estimated characteristics include one or more of height, weight, length, type of object, and hair length.

19. The method of claim 17,
wherein the pattern database includes a plurality of pattern signatures, each pattern signature associated with an object having object characteristics, and
wherein the threshold signature is generated based on a selection of the pattern signature having objects characteristics similar to the estimated characteristics.

20. The method of claim 16, wherein the reserved object in the non-infrared photograph is an occupant's pet.

* * * * *